United States Patent [19]

Kojima

[11] Patent Number: 4,572,725
[45] Date of Patent: Feb. 25, 1986

[54] AIR DRYER DEVICE

[75] Inventor: Katsumi Kojima, Yokosuka, Japan

[73] Assignee: Nippon Air Brake Co., Ltd., Japan

[21] Appl. No.: 675,845

[22] Filed: Nov. 28, 1984

[30] Foreign Application Priority Data

Dec. 30, 1983 [JP] Japan .............................. 58-248777

[51] Int. Cl.[4] ............................................ B01D 53/04
[52] U.S. Cl. ...................................... 55/274; 55/316;
55/387; 55/518; 55/DIG. 17
[58] Field of Search .................. 55/274, 275, 316, 387,
55/389, 325, 518, 519, DIG. 17; 210/94, 95

[56] References Cited

U.S. PATENT DOCUMENTS

| 2,325,657 | 8/1943 | Burkness ............................ 55/274 X |
| 2,528,539 | 11/1950 | Norgren et al. ....................... 55/274 |
| 2,575,234 | 11/1951 | Race, Jr. ............................... 55/275 |
| 2,621,753 | 12/1952 | Urdahl .................................. 55/275 |
| 3,171,726 | 3/1965 | Roney et al. ........................... 55/275 |
| 3,199,488 | 8/1965 | Farr ..................................... 55/274 X |
| 3,464,186 | 9/1969 | Hankison et al. ................... 55/387 X |
| 3,527,027 | 9/1970 | Knight et al. ........................ 55/275 |
| 3,705,480 | 12/1972 | Wireman ............................. 55/316 X |
| 3,841,484 | 10/1974 | Domnick ............................ 55/274 X |
| 3,891,417 | 6/1975 | Wade .................................. 55/274 |
| 4,015,959 | 4/1977 | Grote ................................. 55/316 X |

| 4,154,586 | 5/1979 | Jones et al. .......................... 55/274 |

FOREIGN PATENT DOCUMENTS

| 644230 | 7/1962 | Canada ................................. 55/275 |
| 46214 | 4/1936 | France ................................. 55/274 |
| 1150184 | 1/1958 | France ................................. 55/274 |

Primary Examiner—Robert Spitzer
Attorney, Agent, or Firm—Kane, Dalsimer, Kane, Sullivan and Kurucz

[57] ABSTRACT

An air dryer device for drying compressed air includes a housing having an inlet port and an outlet port. An elongated desiccant container is mounted within the housing and holding a desiccant therein. One end of the desiccant container communicates with the inlet port while the other end communicates with the outlet port, so that the compressed air fed to the inlet port is passed through the desiccant container to be dried and is discharged from the outlet port. At least part of the desiccant container is transparent. An inspection window is mounted on the housing in opposed relation to the transparent part of the desiccant container so that the desiccant in the desiccant container can be viewed from outside the housing through the inspection window and the transparent part of the desiccant container.

14 Claims, 4 Drawing Figures

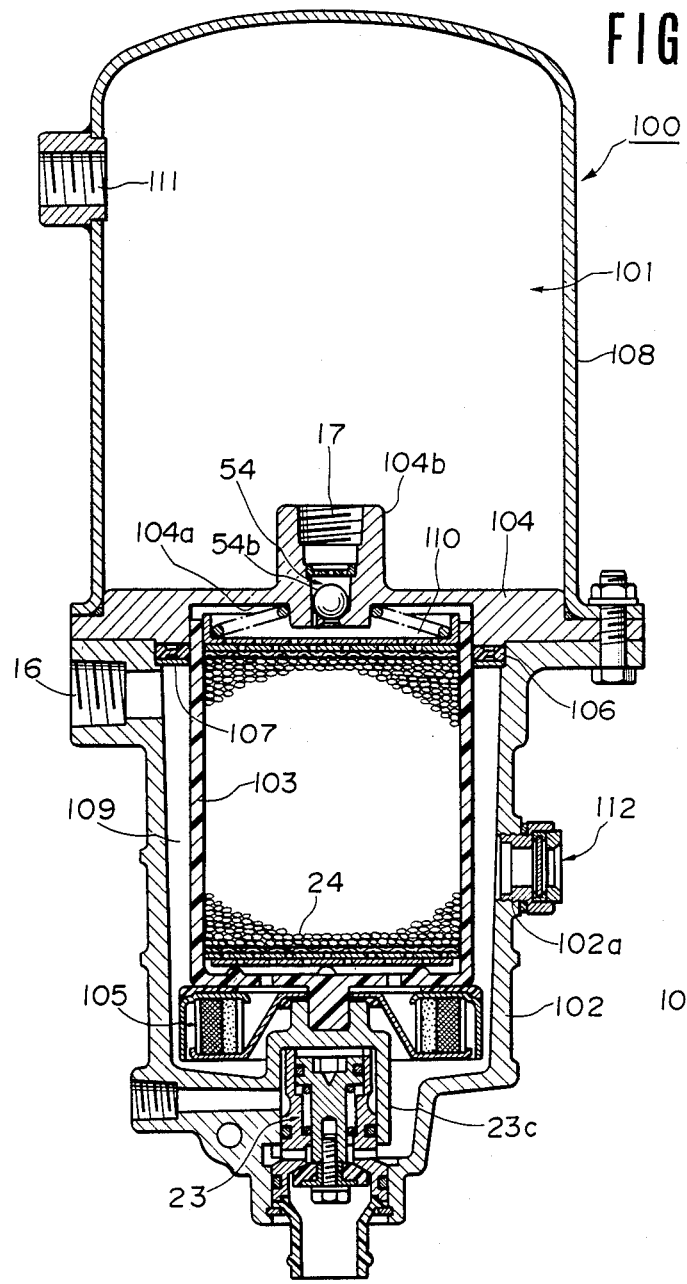

AIR DRYER DEVICE

BACKGROUND OF THE INVENTION

1. Field of the Invention

This invention relates to an air dryer device for drying compressed air of compressed air system, such as air brake, for a vehicle.

2. Prior Art

A typical example of conventional air dryer devices under consideration as disclosed in U.S. Pat. No. 3,464,186 comprises a housing having an open end, an end cover connected to the open end of the housing and having an inlet port and an outlet port, and a desiccant container mounted within the housing. Compressed air flows through the inlet port, the desiccant container and the outlet port. Part of the air passed through the desiccant container is frequently caused to backflow through the desiccant container to regenerate the desiccant therein, but when the drying ability of the desiccant becomes much lowered, the desiccant must be replaced by a new one. Upon studying the lowering of the drying ability of the desiccant, it has been found that it depends to a large extent upon an oil contamination rather than on a deterioration due to the lapse of time. This oil contamination arises from the fact that part of a lubricating oil for an air compressor is entrained in the compressed air and is introduced into the desiccant container. It has therefore been long desired to be able to easily check or inspect the degree of oil contamination so that the desiccant, when found contaminated beyond an acceptable level, can be replaced by a new one without delay.

SUMMARY OF THE INVENTION

It is therefore an object of this invention to provide an air dryer device in which the oil contamination of the desiccant can be easily inspected from outside of the dryer device.

According to the present invention, there is provided an air dryer device for drying compressed air which comprises a housing having an inlet port and an outlet port; an elongated desiccant container mounted within the housing and holding a desiccant, one end of the desiccant container communicating with the inlet port while the other end communicates with the outlet port so that the compressed air fed to the inlet port is passed through the desiccant container to be dried and is discharged from the outlet port, at least part of the desiccant container being transparent; and an inspection window mounted on the housing in opposed relation to the transparent part of the desiccant container so that the desiccant in the container can be viewed from outside the housing through the inspection window and the transparent part of the container.

BRIEF DESCRIPTION OF THE DRAWINGS

FIG. 3 is a view similar to FIG. 1 but showing another modified air dryer device; and FIG. 4 is an enlarged fragmentary view of the dryer device of FIG. 3, showing an inspection window.

DESCRIPTION OF THE PREFERRED EMBODIMENTS OF THE INVENTION

Figure 1:
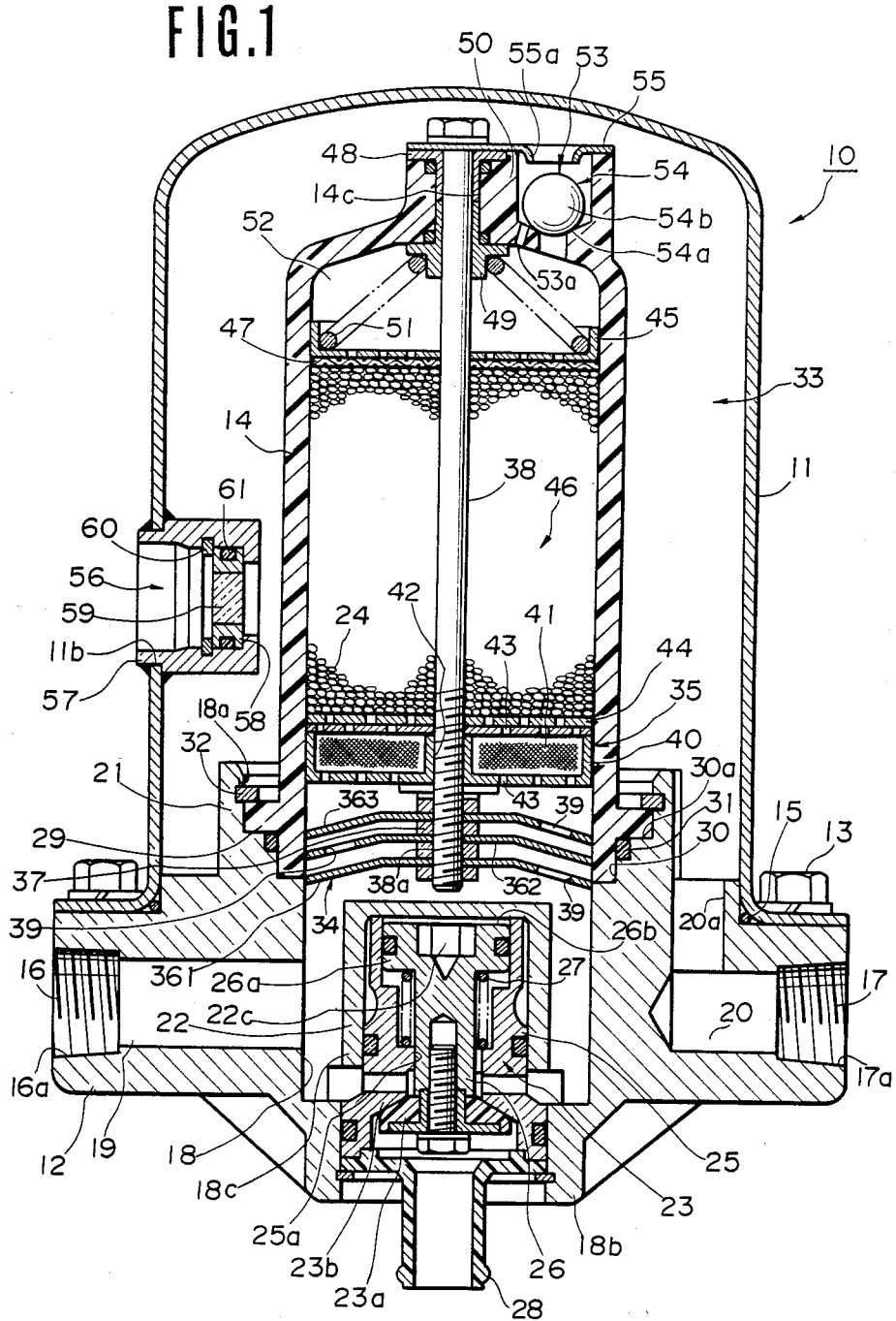
FIG. 1 is a cross-sectional view of an air dryer device provided in accordance with the present invention.

Like reference numerals denote corresponding parts in several views.

An air dryer device 10 shown in FIG. 1 comprises a cylindrical member 11 having an open bottom, an end cover 12 of a circular shape fixedly secured to the open bottom of the cylindrical member 11 by bolts 13, and a desiccant container 14 mounted within the cylindrical member 11. The cylindrical member 11 and the end cover 12 constitutes a housing for the air dryer device 10. Connection between the cylindrical member 11 and the end cover 12 is made air-tight by a seal ring 15 interposed therebetween.

The end cover 12 has an inlet port 16 formed in a periphery thereof and connected to an air compressor (not shown). An outlet port 17 connected to a main reservoir (not shown) is formed in the periphery of the end cover 12 in generally diametrically opposed relation to the inlet port 16. The inlet and outlet ports 16 and 17 are internally threaded as at 16a and 17a for threadedly receiving their respective air conduits. The end cover 12 has a central bore 18 extending therethrough along an axis thereof. The inlet port 16 communicates with the central bore 18 via a transverse passageway 19. Another transverse passageway 20 extends from the outlet port 17 into the end cover 12, and a passageway 20a extends perpendicularly from the inner end of the passageway 20 and opens to the upper surface of the cylindrical member 11. A tubular portion 21 is formed on the upper surface of the end cover 12 in surrounding relation to the upper end 18a of the central bore 18. The passageway 20a is disposed immediately adjacent to the outer peripheral surface of the tubular portion 21.

The central bore 18 is reduced in diameter at its lower portion which is defined by a tubular portion 18b. A cylindrical portion 22 with a closed top is formed integrally with the tubular portion 18b in coaxial relation thereto. The cylindrical portion 22 cooperates with the tubular portion 18b to provide a valve housing 18c for a drain valve 23 which is selectively opened to discarge a drain liquid resulting from water and oil vapor of the compressed air and also to discharge the air stored in the air dryer device 10 for regenerating a desiccant 24 in the desiccant container 14. A hollow plug 25 is fitted in the valve housing 18c and has a tapered valve seat 23b and an intermediate flange 25a. A plunger 26 is received in the plug 25 for sliding movement along an axis thereof, the plunger 26 having a flange 26a at its upper end. A tapered valve element 23a of an elastic material is secured to the lower end of the plunger 26. A compression coil spring 27 is mounted around the plunger 26 and acts between the flange 26a of the plunger 26 and the flange 25a of the plug 25 for normally urging the valve element 23a into sealing engagement with the valve seat 23b to close the drain valve 23. A control passage (not shown) is provided in the end cover 12 and leads to a space 22c defined by the valve housing 18c, the plug 25 and the plunger 26. This passage is connected to an air governor (not shown) provided exteriorly of the air dryer device 10. When the pressure of the air in the main reservoir reaches a predetermined level, pressurized air is applied as a pneumatic signal to the space 22c from the air governor and acts on the upper surface 26b of the plunger 26 to move the plunger 26 downwardly against the bias of the spring 27, thereby bringing the valve element 23a out of sealing engagement with the valve seat 23b to open the drain valve 23. A discharge tube 28 is mounted on the tubular portion 18b for discharging the drain liquid and the air when the drain valve 23 is opened.

The desiccant container 14 of a cylindrical shape is mounted on the end cover 12, the container 14 having a closed upper end and an opened lower end. The tubular portion 21 of the end cover 12 has at its inner peripheral surface a stepped section 30 in which the lower end of the desiccant container 14 is snugly fitted in coaxial relation to the tubular portion 21. The desiccant container 14 has at its lower end a peripheral flange 29 which rests on a shoulder 30a of the stepped section 30. The flange 29 is interposed between a seal ring 31 and a retainer ring 32. The flange 29 serves not only to reinforce the lower end of the desiccant container 14 but also to hold the container 14 in position together with the retainer ring 32.

The desiccant container 14 is disposed in concentric relation to the cylindrical member 11 and is smaller in size than it so that a space or chamber 33 is defined by the cylindrical member 11, the container 14 and the end cover 12. The compressed air is stored in the space 33 for regenerating the desiccant 24 filled in the container 14. The desiccant 24 is in the form of granules and serves to remove the water content or moisture from the compressed air. A filter means is provided in the desiccant container 14 for removing contaminants such as oil, dust and dirt contained in the compressed air fed from the air compressor. The filter means comprises a first filter unit 34 for removing relatively large droplets of oil and a second filter unit 35 for removing particles of the contaminants such as oil mist. The first filter unit 34 is mounted at the lower end of the desiccant container 14, and the second filter unit 35 is disposed above the first filter unit 34 immediately adjacent thereto, so that the compressed air fed to the inlet port 16 flows through the first filter unit 34 and the second filter unit 35.

The first filter unit 34 comprises three plates 361, 362, 363 spaced predetermined distance from one another by spacers 37. A rod 38 extends through the desiccant container 14 along an axis thereof, the rod 38 having a threaded lower portion 38a which extends through the filter plates 361, 362, 363 at their centers. The spacers 37 are threaded on the threaded portion 38a. The spacers 37 may be provided as a unitary construction. Each of the filter plates 361, 362, 363 is of an inverted dish-shape and has apertures 39 formed therethrough and disposed in eccentric relation to its center. The first plate 361 is held in contact with the central bore 18 at its periphery, and the second and third plates 362, 363 are held at their peripheries in contact with the inner peripheral surface of the desiccant container 14 which coincides with the central bore 18. The apertures 39 of the first plate 361 is disposed remote from the passageway 19, that is, in a right-hand side of the plate 361 (FIG. 1), and the apertures 39 of the second filter plate 362 is disposed in diametrically opposite relation to the apertures 39 of the first filter plate 361. The apertures 39 of each adjacent filter plates are disposed in staggered relation to each other, and the distance between each adjacent filter plates is so small that the compressed air passed through the apertures 39 of a lower one of each adjacent filter plates impinges on the lower surface of the upper filter plate. With this arrangement, oil and moisture entrained in the compressed air fed to the inlet port 16 collect on the outer surface of the cylindrical portion 22 and the lower surfaces of the filter plates to form droplets of oil and water which drop toward the drain valve 14 under the influence of gravity.

The second filter unit 35 comprises a hollow body 40 of a circular shape and a filter element 41 of ceramics received in the body 40, the body 40 having a central hole 42 through which the rod 38 extends. Each of upper and lower walls of the body 40 has a plurality of apertures 43. The second filter unit 35 removes the oil mist in the compressed air which oil mist the first filter unit 34 fails to arrest. A lower perforated plate 44 is placed on the filter body 40. An upper perforated plate 45 is also received in the desiccant container 14, and the rod 38 extends through the plate 45. The desiccant 24 is filled in a space 46 defined by the side wall of the desiccant container 14 and the upper and lower perforated plates 45 and 44. An air-permeable cloth 47 is provided adjacent to the upper perforated plate 45. An upper tubular member 48 and a lower tubular member 49 are fitted in a hole 14c formed in a boss of the desiccant container 14, the rod 38 extending through the upper and lower tubular members 48 and 49. A spring 51 acts between the lower tubular member 49 and the upper perforated plate 45 to hold the desiccant 24 in position.

The space 33 for storing the compressed air communicates with the outlet port 17 through the passageways 20a and 20, and also the space 33 communicates with a space 52 in the upper end portion of the container 14 through a port 53 formed through the boss 50. The port 53 is reduced in diameter at its lower portion to provide a valve seat 54a for a valve element 54b in the form of a ball. Thus, the ball 54b cooperates with the boss 50 to provide a check valve 54. A passageway 53a is formed in the boss for by-passing valve 54. A retainer plate 55 having an aperture 55a is attached to the upper surface of the boss 50 for retaining the ball 54b in the port 53. The retainer plate 55 is clamped to the upper tubular member 48 by the rod 38. Thus, the retainer plate 55 serves as a washer for the rod 38 and also cooperates with the upper and lower tubular members 48 and 49 to prevent a fatigue of the boss 50.

The desiccant container 14 is made of a transparent or semi-transparent engineering plastics material so that the contamination of the desiccant 24 by the oil can be observed through an inspection window 56 from outside the air dryer device 10. The inspection window 56 is mounted on the cylindrical member 11 at a level intermediate the upper and lower surfaces of the layer of desiccant 24 in the desiccant container 14. More specifically, the layer of desiccant 24 becomes contaminated by the oil or the like from its bottom, and therefore the inspection window 56 is positioned at a level or height corresponding to that height of the desiccant layer which is the limit of the oil contamination beyond which the desiccant 24 fails to efficiently remove the moisture from the compressed air fed to the desiccant container 14 and therefore must be replaced by a new one. For example, the height of such oil contamination of the desiccant layer is one fifths to one thirds of the desiccant layer from the bottom.

The inspection window 56 comprises a tubular body 57 of metal fitted in and secured to an aperture 11b of the cylindrical member 11 by welding or the like, an annular frame 58 fitted in the tubular body 57, a circular pane 59 of glass fitted in the annular frame 58 and secured thereto, for example, by an adhesive, and a retainer ring 60 received in the tubular body 57 for holding the annular frame 58 against movement. A seal ring 61 is fitted on the annular frame 58. The glass pane 59 may be replaced by a lens for facilitating the inspection of the desiccant 24. Only the outer end of the tubular body 57 extends slightly outwardly of the side wall of the cylindrical member 11, and the remainder of the tubular body 57 is received within the space 33. Thus, the inspection window 56 can be suitably accommodated within the cylindrical member 11 and can be prevented from damage.

In order to check the oil contamination level of the desiccant 24 clearly, it is preferred that graduations or color marks should be provided on one surface of either the desiccant container 14 or the glass pane 59. Also, the oil contamination can be easily checked by applying light to the desiccant 24 through the inspection window 56 and the desiccant container 14, using an electric torch or the like.

Figure 2:
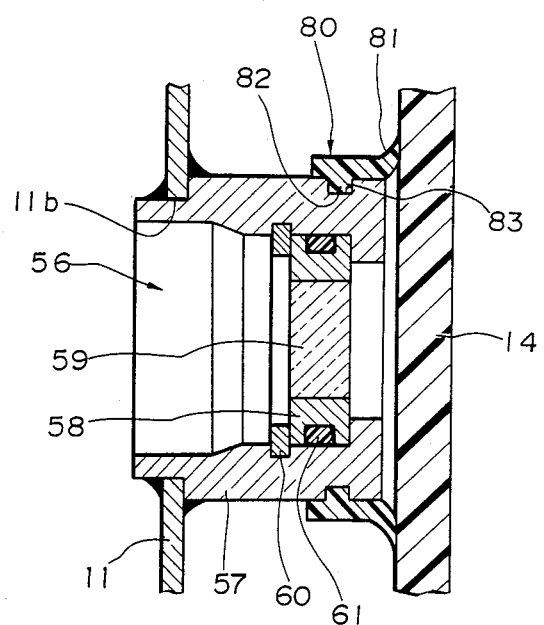
FIG. 2 is an enlarged fragmentary view of a modified air dryer device.

A modified air dryer device as shown fragmentarily in FIG. 2 differs from the air dryer device 10 of FIG. 1 in that a hood 80 or seal member of an elastic material such as rubber is mounted on the inner end of a tubular body 57 of an inspection window 56. The inner end of the tubular body 57 is disposed in closely spaced relation to the outer peripheral surface of a desiccant container 14. The annular hood 80 has a lip 81 at its free end and an inner peripheral flange 82 snugly fitted in a peripheral groove 83 formed on the outer surface of the tubular body 57. In this condition, the lip 81 of the hood 80 is held in sealing engagement with the outer peripheral surface of the desiccant container 14. The hood 80 serves to prevent the inspection window 56 from becoming tarnished or opaque by the droplets of water and oil.

FIG. 3 shows another modified air dryer device 100 which differs from the air dryer device 10 of FIG. 1 mainly in that a purge tank 101 replacing the cylindrical member 11 is mounted on the air dryer unit. Many parts of the dryer device 100 are similar to those of the dryer device 10 of FIG. 1 and therefore the description of those parts will be omitted or made briefly.

The air dryer device 100 comprises a generally cylindrical body 102, a cylindrical desiccant container 103 received in the body 102, and a drain valve 23 similar in construction to the drain valve 23 of FIG. 1. An end cover 104 is hermetically secured to the upper open end of the body 102. The body 102 and the end cover 104 constitutes a housing for the air dryer device 100. A filter unit 105 for removing oil, dust and the like from the compressed air fed to the dryer device 100 is supported on a valve housing 23c of the drain valve 23. The desiccant container 103 is also supported on the valve housing 23c. An open end of the desiccant container 103 is snugly fitted in a recess 104a of the end cover 104. A seal ring 106 is fitted on the desiccant container 103 adjacent to its upper end. The seal ring 106 is held in position by the end cover 104, the dryer body 102 and a retaining ring 107. The seal ring 106 ensures an airtight connection between the desiccant container 103 and the end cover 104.

A cylindrical member 108 defining the purge tank 101 has an open lower end and is hermetically secured at its lower end to one side of the end cover 104 facing away from the desiccant container 103. The end cover 104 has a central tubular portion 104b in which a ball 54b is received to provide a check valve 54, the tubular portion 104a having an outlet port 17 at the upper end of its bore. An annular space 109 is formed between the concentrically-disposed dryer body 102 and desiccant container 103. The compressed air fed from a compressor (not shown) flows through an inlet port 16 of the dryer body 102, the annular space 109, the filter unit 105, the desiccant container 103, a space 110 and the outlet port 17 into the purge tank 101. During the passage of the compressed air in this way, droplets of water and oil are caused to collect on the peripheral surface of the desiccant container 103 and the inner peripheral surface of the dryer body 102. The compressed air introduced into the inlet port 16 is filtered by the filter unit 105, and then the moisture of the compressed air is removed by the desiccant 24. The compressed air is filled in the purge tank 101 and is discharged from a discharge fitting 111, attached to the cylindrical member 108, to a main reservoir (not shown).

The desiccant container 103 is made of a transparent or semi-transparent engineering plastics material as described above for the desiccant container 14 of FIG. 1. An inspection window 112 is mounted on the dryer body 102 intermediate opposite ends thereof. The compressed air fed through the inlet port 16 into the dryer body 102 contains moisture and oil, and droplets of water and oil much collect on the inner peripheral surface of the dryer body 102 and the outer peripheral surface of the desiccant container 103 adjacent to the inlet port 16. For this reason, perferably, the inspection window 112 is positioned on the opposite side of the inlet port 16 so that the inspection window 112 can be prevented from becoming tarnished or opaque by the droplets of water and oil.

As best shown in FIG. 4, the inspection window 112 comprises a tubular body 113 threaded into a threaded aperture 102a formed in the dryer body 102, a seal ring 114 fitted in the tubular body 113, a pane 115 of transparent glass fitted in the seal ring 114, and a retainer ring 116 for holding the seal ring 114 against movement. A seal ring 117 is fitted on the tubular body 113 and interposed between the dryer body 102 and the tubular body 113. Since the tubular body 113 is threadedly connected to the dryer body 102, the former can easily removed from the latter for cleaning and maintaining the inspection window 112.

In order to prevent the inspection window 112 from becoming tarnished or opaque by water and oil droplets of the compressed air, an annular hood may be mounted on the inner end of the tubular body, as described above for the air dryer device 100 of FIG. 3.

While the air dryer devices according to the present invention have been specifically shown and described herein, the invention itself is not to be restricted by the exact showing of the drawings or the description thereof. For example, a desiccant container may be of an opaque material such as metal and has at its peripheral wall a transparent portion disposed in opposed relation to the inspection window mounted on the dryer body. The cylindrical member 11 and the dryer body 102 may be made entirely of a transparent or semi-transparent material. In this case these members 11 and 102 serve as the inspection window. Also, the desiccant container 14,103 of a one-piece molded construction may be provided with reinforcement ribs or the like to increase a strength thereof.

What is claimed is:

1. An air dryer device for drying compressed air which comprises:

(a) a housing having an inlet port and an outlet port;

(b) an elongated desiccant container mounted within said housing and holding a granular desiccant therein which may be regenerated by reverse flushing, one end of said desiccant container communicating with said inlet port while the other end communicates with said outlet port, so that the compressed air fed to said inlet port is passed through said desiccant container to be dried and is discharged from said outlet port, at least part of said desiccant container being transparent;

(c) an inspection window mounted on said housing at a predetermined level in opposed relation to said transparent part of said desiccant container so that said desiccant in said desiccant container can be viewed from outside said housing through said inspection window and said transparent part of said desiccant container for inspecting an oil contamination level of said desiccant, said inspection window including a lens; and (d) a drain valve mounted below the desiccant container which may be selectively opened to drain said container and regenerate the desiccant.

2. An air dryer device according to claim 1, in which said desiccant container is made entirely of a transparent material.

3. An air dryer device according to claim 1, in which said housing comprises an end cover and a cylindrical member having an open bottom and hermetically connected to said end cover at its open bottom, said desiccant container being disposed in concentric relation to said cylindrical member to form a space therebetween, said inlet and outlet ports being formed in said end cover, and said other end of said desiccant container communicating with said outlet port through said space.

4. An air dryer according to claim 3 wherein said space is provided to store compressed air for reverse flushing said container when said drain valve is opened to regenerate the desiccant.

5. An air dryer according to claim 4 wherein said container communicates with said space through a check valve which allows gas flow from the container and a passageway by-passing the check valve.

6. An air dryer device according to claim 1, in which said housing comprises an end cover and a cylindrical body having an open top and hermetically connected to said end cover at its open top, said desiccant container being disposed in concentric relation to said cylindrical body to form a space therebetween, said inlet port being formed in said cylindrical body while said outlet port is formed in said end cover, and said inlet port communicating with said one end of said desiccant container through said space.

7. An air dryer device according to claim 6, in which said inlet port and said inspection window are disposed on opposite sides of said container, respectively.

8. An air dryer according to claim 6 further comprising a purge tank communicating with said container for storing compressed air provided to regenerate said desiccant when said drain valve is opened.

9. The air dryer according to claim 8 wherein said purge tank communicates with said container through a check valve allowing gas flow from said container and a passageway for by-passing the check valve.

10. An air dryer device according to claim 1, in which said inspection window is almost received in said housing.

11. An air dryer device according to claim 1, in which said inspection window is removably attached to said housing.

12. An air dryer device according to claim 1, in which said inspection window comprises a tubular body extending through said housing and said lens is fitted in said tubular body.

13. An air dryer device according to claim 12, in which a seal member is mounted between the inner end of said tubular body and the outer surface of said desiccant container to provide a liquid-tight seal therebetween.

14. The air dryer according to claim 1 wherein said desiccant has upper and lower surfaces separated by a distance and said predetermined level is at a range of one-fifth to one-third of said distance from the bottom surface.

* * * * *